July 26, 1949.  J. H. HART  2,477,179

MODEL FOR DEMONSTRATING ATOMIC STRUCTURE AND THEORY

Filed March 13, 1946

Inventor:
James H. Hart,
Heard Smith & Tennant
Attorneys

Patented July 26, 1949

2,477,179

UNITED STATES PATENT OFFICE 2,477,179

MODEL FOR DEMONSTRATING ATOMIC STRUCTURE AND THEORY

James H. Hart, Andover, Mass.

Application March 13, 1946, Serial No. 654,011

6 Claims. (Cl. 35—18)

This invention relates to apparatus for use in the teaching of atomic structure and theory.

Usual information of atomic structure and theory is obtained by the study of descriptive matter and accompanying diagrams contained in text books and scientific articles which are more or less obscure because of their technical character and difficulty of appreciation. The general object of the invention is to provide a device which may be described as a model visually showing a greatly exaggerated simulation of the structure of various different atoms and so constructed that it can be readily manipulated to shift from the representation of an atom of one element to the representation of an atom of another element.

The purpose of the invention is to provide means which will arouse and sustain interest of a student in the subject matter being taught, to clarify the topic because of its visual reality, to impress the atomic structure and theory more firmly in the mind of the student by giving him something concrete which will recall the atomic theory more visually, and which will tend to decrease the amount of time required to teach the atomic theory. Furthermore, by reason of the ability of the model to be quickly changed from the representation of one type of atom to that of another, interest in the subject matter will be maintained which otherwise would be lost during the interval required by successive demonstrations of the respective types of atoms.

It is generally understood that atoms are composed of electrons and protons and that an electrically neutral atom must have the same number of electrons as protons and that the electrons rotate about the proton because the latter is much nearer the center of mass of the atom. It is also understood that the nucleus of an atom comprises protons of positive electric charge and neutrons having neither a positive nor a negative electric charge with electrons circulating in orbits around the nucleus and furthermore that the series of orbital electrons are assumed to be located about the nucleus only in certain definite energy levels.

A further object of the invention is to provide a device illustrating the nucleus surrounded by means illustrative of the concentric orbits surrounding the nucleus in which the respective series of electrons travel and providing means releasably attached to the respective rings which, by removal or replacement, may demonstrate the atomic structure of different elements and combinations of atoms produced thereby.

A further object of the invention is to provide a model of the character disclosed which may be employed correctly to interpret and predict many of the characteristics of an element.

These and other objects and features of the invention will more fully appear from the following description and the accompanying drawings and will be particularly pointed out in the claims.

A preferred embodiment of the invention is illustrated in the drawing, in which, Fig. 1 is a front view of a device or model embodying the invention;

Figure 1:
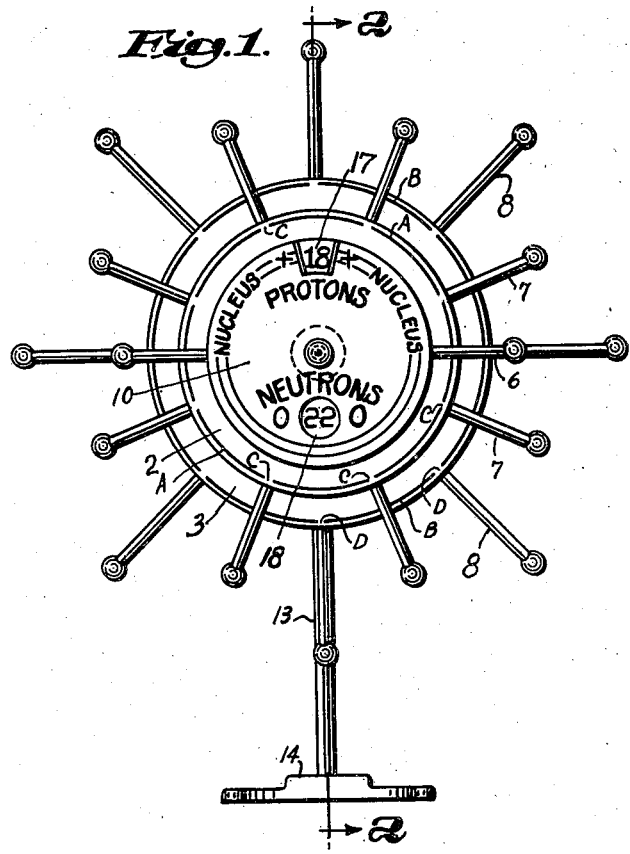
Figure 2:
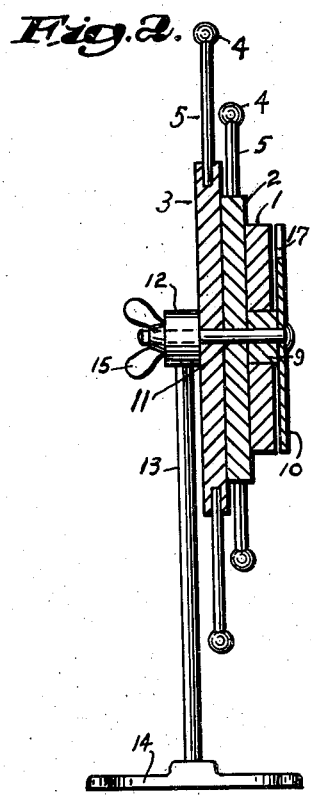
Fig. 2 is a vertical median sectional view on line 2—2, Fig. 1.

The model shown in the drawing is designed for demonstrating and explaining the atomic structure of the first 17 elements in a periodic table and hydrogen.

Essentially the model is made up of a co-axial assemblage of four circular disks preferably mounted upon a common axis. Disks 1, 2, and 3, are provided with means representative respectively of the first three successively greater orbital paths of the electrons with a foremost dial 10 representing the nucleus of the atom and having means cooperating with the juxtaposed disk 1 to define the first electronic ring of any element.

As illustrated in the model the foremost dial is of the same diameter as the disk 1 which is rotatable about said axis.

Figure 3:
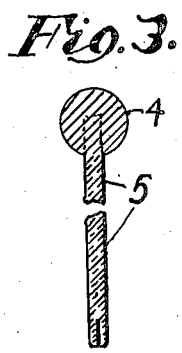
Fig. 3 is an enlarged view of a rod having at one end a ball illustrative of the electron and a stem of transparent material illustrative of space between the electron and the nucleus when inserted in a socket in the periphery of the disk.

Suitable means are provided for illustrating the successive concentric electronic rings. One of such means consists in providing disks 2 and 3 with successively greater diameters than the nucleus disk 10, thereby showing the concentric orbital paths or rings surrounding the nucleus. Another of such means consists in providing sockets in the peripheries of the respective disks, and rods having preferably spherical heads 4 and transparent stems 5, as shown in Fig. 3, illustrative of space, adapted to be seated in suitably equally spaced sockets in the respective disks, the rods 6, 7, and 8 applicable to the respective disks being of successively greater lengths. Both of such means are embodied in the model shown in the drawing, but it will be readily understood that the successively larger orbital paths may also be made apparent if the disks are of the same diameter and the transparent rods applied to the successive disks are of successively greater length.

Any suitable means may be provided for securing the disks 1, 2, 3 and the dial 10 in co-axial assemblage as a means of conserving materials and labor and purely as a matter of choice, the disk 1 is utilized as the first electron ring and in addition the front face of the disk is also used as a surface for imprinting numbers thereon of protons and neutrons of particular elements. When the disk is rotated, any particular set of numbers imprinted on the face of the disk may be made to appear through the openings in the nucleus disk 10. In order to secure this rotative motion of the disk 1, the disk is mounted on a bushing 9. A bolt 11 extends axially through the nucleus dial 10, the bushing 9, and disks 2 and 3. As illustrated herein the bolt 11 extends through the cylindrical head 12 of a vertical standard 13 which is mounted on a suitable base 14 and the end of the bolt is provided with a wing nut 15 adapted to engage said head. Bushing 9 is of slightly greater thickness than the disk 1 so that when the bolt 11 is tightened, the nucleus dial 10, the bushing 9, and the disks 2 and 3 are all tightened against one another while the disk 1 is left free to rotate.

The nucleus dial 10 is provided with a window 17 at or adjacent its periphery through which the proton number of a particular element imprinted on the dial 1 may be exposed and the dial 10 is also provided with a window opening 18 through which the neutron number of the same element is simultaneously exposed, the windows 17 and 18 desirably being diametrically opposite and at different radial distances from said axis.

Circles A and B are imprinted on the faces of the disks 2 and 3 near the circumference of those disks in order to suggest the ring or orbital arrangement of the electrons around the nucleus. In addition, these circles are distinctly broken to provide spaces C and D near the location of each socket on the peripheries of the disks thus indicating where the means adapted to illustrate electrons may be releasably applied to the respective disks. Obviously, this makes it easier to identify the position of the sockets in which the rods are to be inserted and hence aids in the manipulation of the model.

In demonstrating the structure of any atom of an element of atomic number 18 or less only one fact is necessary—the atomic number of the element. The representation of the atomic structure may then be done in two steps: (1) rotate the disk 1 until the number that appears in the proton window 17 is the same as the atomic number. The correct number of neutrons will then automatically appear in the neutron window 18. (2) Then insert electron rods first in the two sockets in the periphery of the disk 1, then insert the next longer electron rods in the disk 2 until the sum of the rods thus inserted equals the number of protons. If, for example, when the eight rods are inserted in the disk 2 the number of rods thus inserted does not equal the number of protons, additional electron rods are inserted in the largest disk 3 until the total number of rods thus inserted equals the number protons.

When these steps have been followed, the model will accurately fit the theory of the atomic element in question.

The three disks of successively greater diameter, which have sockets provided for the electron rods and/or the respective lengths of the rods are representative of the first three electron rings or orbits that surround the nucleus. The filling of the sockets of successive disks with electron rods indicates the degree to which the electron ring is "complete." The completeness or lack of completeness of the electron rings thus obtained may be used correctly to interpret and predict some of the following characteristics of the element, for example, (1) metal or non-metal;
(2) lender or borrower of electrons;
(3) valence;
(4) general chemical activity;
(5) acid or base-forming tendencies;
(6) probable formula of the oxide or hydride of the element;
(7) amount and type of charge on the ion of the element;
(8) probable electrical conductivity of the element;
(9) other characteristics that may also be predicted from the structure of the atom according to the electronic theory may also be predicted from the representation produced by the model.

As illustrative of the bases upon which such characteristics may be predicted, the following example is illustrative, (1) An element with the atomic number 11 would have two electrons in the first orbit, (those of the disk 1), 8 in the second orbit, and one in the third orbit.

Since atoms of elements act as though they are seeking ring completeness (meaning having all the electrons provided that are called for by the particular electron ring) this particular element could gain ring completeness either (a) by borrowing seven other electrons from some other element by chemical combination, or (b) by lending out the single electron that it has and thereby "retreating" back into the completeness of the second ring. Since this element is obviously nearer to ring completeness by lending the one electron it has rather than by borrowing seven additional electrons this element would tend to be a lender.

(2) Elements that are lenders of electrons are metals.

(3) Elements that are borrowers of electrons are non-metals.

(4) The number of electrons that an element tends to borrow or lend gives its valence number. If it tends to lend electrons its valence is positive and if it tends to borrow electrons its valence is minus.

(5) The closer an element is to ring completeness in either direction (that is the fewer number of electrons it has to borrow or lend to attain ring completeness) the more chemically active the element will be.

(6) Elements that borrow electrons tend to form acids. Elements that lend electrons tend to be bases. The greater the activity of the element in general the greater the strength of the acid or base.

(7) From the valence previously determined the probable formula of the oxide or hydroxide can be predicted.

(8) The charge of the ion will be positive or negative just as the valence is and will also be the same number as the valence.

(9) The degree of electrical conductivity will coincide closely with the metallic tendencies.

The atomic construction of any element and the characteristics thereof above pointed out will be visually explained to a student in a very much shorter time in such manner as to enable him to comprehend the same and will also produce upon his mind lasting impressions which will be more readily retained than explanations obtained from a text book or other scientific articles.

Having thus described the invention, what is claimed as new, and desired to be secured by Letters Patent, is:

1. A model for demonstrating atomic structure and theory having a coaxial assembly of circular disks mounted upon a common axis comprising a dial adapted to represent the nucleus of the atom and having a sight aperture therethrough, a cooperating juxtaposed relatively rotatable disk having thereon a circular series of numbers of protons of different atoms adapted to be brought respectively into registry with said aperture, and one or more disks concentric with said rotatable disk having a circle or circles thereon adapted to represent the electron ring or rings.

2. A model for demonstrating atomic structure and theory having a coaxial assembly of circular disks mounted upon a common axis comprising a dial having sight apertures therethrough, a cooperating juxtaposed relatively rotatable disk having thereon concentric series of numbers of protons and neutrons of different elements so positioned that the correct number of protons and neutrons of a particular atom will be simultaneously visible through the respective apertures, and one or more disks concentric with said rotatable disk having a circle or circles thereon adapted to represent the electron ring or rings.

3. A model for demonstrating atomic structure and theory having a co-axial assemblage of circular disks provided with means adapted to represent the nucleus of an atom and the successively greater orbital paths of electrons of different atoms around the nucleus comprising a foremost nucleus dial having a sight aperture therethrough and a juxtaposed rotatable disk cooperating therewith having imprinted thereon a circular series of numbers of protons of different atoms so positioned that upon rotation of said disk the correct number of protons of a particular atom will be visible through said sight aperture in the nucleus dial and one or more disks rearwardly of and concentric with said rotatable disk having circular means adapted to represent electronic rings of successively greater orbital arrangement and the positions therein of releasable electrons, whereby by application or removal of electrons completeness or incompleteness of the electronic rings of the atoms of any element may be demonstrated.

4. A model for demonstrating atomic structure having a co-axial series of circular disks provided with means adapted to represent the nucleus of an atom and the successively greater orbital paths of electrons of different atoms around the nucleus comprising a foremost nucleus dial having a sight aperture and a juxtaposed rotatable disk cooperating therewith having imprinted thereon concentric circular series of numbers of protons and neutrons of different atoms so positioned that the correct numbers of the protons and neutrons of a particular atom will be simultaneously visible through the respective apertures, one or more disks concentric with said rotatable disk having means including circles imprinted thereon adapted to represent electronic rings of greater orbital arrangement, said rings being broken at equal intervals to indicate the positions of releasable electrons in the respective rings, whereby by application or removal of means illustrative of said electrons completeness or incompleteness of the electronic rings of the atoms of any element may be demonstrated.

5. A model for demonstrating atomic structure and theory having a coaxial assembly of circular disks comprising a foremost nucleus dial adapted to represent the nucleus of the atom and having a sight aperture therethrough, a cooperating juxtaposed relatively rotatable disk having thereon a circular series of numbers of protons of different atoms adapted to be brought respectively into registry with said aperture, one or more disks located rearwardly of said rotatable disk each having equally spaced means for receiving means illustrative of electrons, and means illustrative of electrons releasably attached to said disk or disks and having stems of different lengths adapted to represent the different orbits and made of transparent material indicative of orbital space.

6. A model for demonstrating atomic structure and theory having a coaxial assembly of circular disks comprising a foremost nucleus dial adapted to represent the nucleus of the atom and having sight apertures therethrough, a cooperating juxtaposed relatively rotatable disk having thereon concentric series of numbers of protons and neutrons so positioned that upon suitable rotation of said rotatable disk the correct numbers of protons and neutrons of a particular atom will be simultaneously visible through the respective apertures, one or more disks located rearwardly of said rotatable disk having eight equally spaced sockets in each disk for receiving means illustrative of electrons, and means illustrative of electrons and having stems of different lengths for different orbits and made of transparent material indicative of orbital space adapted to be inserted in the sockets of the respective disks.

JAMES H. HART.

REFERENCES CITED

The following references are of record in the file of this patent:

UNITED STATES PATENTS

| Number | Name | Date |
| --- | --- | --- |
| 575,735 | Reese | Jan. 26, 1897 |
| 659,817 | Jones | Oct. 16, 1900 |
| 2,052,457 | French | Aug. 25, 1936 |